US012491125B2

(12) United States Patent
Nakamura

(10) Patent No.: US 12,491,125 B2
(45) Date of Patent: Dec. 9, 2025

(54) NURSING CARE BED

(71) Applicant: TAIJI CO., LTD., Chiba (JP)

(72) Inventor: Taiji Nakamura, Chiba (JP)

(73) Assignee: TAIJI CO., LTD., Chiba (JP)

( * ) Notice: Subject to any disclaimer, the term of this patent is extended or adjusted under 35 U.S.C. 154(b) by 0 days.

(21) Appl. No.: 18/870,326

(22) PCT Filed: Jan. 27, 2024

(86) PCT No.: PCT/JP2024/002536
§ 371 (c)(1),
(2) Date: Jul. 22, 2025

(87) PCT Pub. No.: WO2024/228283
PCT Pub. Date: Nov. 7, 2024

(65) Prior Publication Data

US 2025/0339325 A1 Nov. 6, 2025

(30) Foreign Application Priority Data

Apr. 29, 2023 (JP) ................................ 2023-075331

(51) Int. Cl.
*A61G 7/10* (2006.01)

(52) U.S. Cl.
CPC ......... *A61G 7/1051* (2013.01); *A61G 7/1017* (2013.01); *A61G 7/1044* (2013.01); *A61G 7/1057* (2013.01); *A61G 7/1076* (2013.01)

(58) Field of Classification Search
CPC .. A61G 7/1051; A61G 7/1017; A61G 7/1044; A61G 7/1057; A61G 7/1076
USPC ............................................................ 5/611
See application file for complete search history.

(56) References Cited

FOREIGN PATENT DOCUMENTS

| | | | |
|---|---|---|---|
| CN | 112826266 | A | 5/2021 |
| JP | H1(1989)-207063 | A | 8/1989 |
| JP | H8(1996)-098861 | A | 4/1996 |
| JP | 2011-087879 | A1 | 5/2011 |
| JP | 2021-019741 | A | 2/2021 |
| JP | 2022-161157 | A | 10/2022 |

OTHER PUBLICATIONS

International Search Report issued Mar. 26, 2024, in PCT/JP2024/002536 (including English translation).
Extended European Search Report issued Jun. 24, 2025, in European patent application No. 24800014.3.

*Primary Examiner* — Adam C Ortiz
(74) *Attorney, Agent, or Firm* — Womble Bond Dickinson (US) LLP

(57) ABSTRACT

The nursing care bed (1) includes: a nursing care mat (5) on which a care recipient (K) lies; a support net (11) which is arranged between the nursing care mat (5) and the care recipient (K) and supports a body of the care recipient (K); a frame body (13) for holding the support net (11) in a horizontally stretched state; and a net lifting unit (21) for raising and lowering the frame body (13). An upper surface (6) of the nursing care mat (5) has a lattice groove (7) corresponding to the support net (11), and the net lifting unit (21) lowers the support net (11) to bury it in the lattice groove (7) and raises the support net (11) to separate the care recipient (K) from the nursing care mat (5).

2 Claims, 5 Drawing Sheets

NURSING CARE BED

TECHNICAL FIELD

The present invention relates to a nursing care bed.

BACKGROUND ART

One essential action in various nursing care and assistance situations is helping a care recipient (person requiring care) get up from bed. It takes a lot of effort to help a care recipient (person requiring care) get up from bed, which places a great physical and mental burden on a caregiver (person giving assistance).

For this reason, a variety of nursing care beds have been developed.

CITATION LIST

Patent Literature

[Patent Literature 1] Japanese Patent Application Laid-Open No. 2022-161157

SUMMARY OF INVENTION

Technical Problem

However, the technique described in Patent Literature 1 requires the caregiver to perform some tasks when helping the care recipient get up from bed, and thus cannot reduce the physical and mental burden on the caregiver.

There is a demand for the development of a nursing care bed that enables a care recipient to get up from bed with almost no assistance from a caregiver.

The present invention provides a nursing care bed that enables a care recipient to get up from bed without assistance (effort) from a caregiver.

Solution to Problem

A nursing care bed according to a first embodiment of the present invention includes: a nursing care mat on which a care recipient lies; a support net which is arranged between the nursing care mat and the care recipient and supports a body of the care recipient; and a net lifting unit for raising and lowering the support net, the nursing care bed being characterized in that: an upper surface of the nursing care mat has a lattice groove corresponding to the support net; and the net lifting unit lowers the support net to bury it in the lattice groove and raises the support net to separate the care recipient from the nursing care mat.

The nursing care bed according to a second embodiment of the present invention is characterized in that it includes a frame body for holding the support net in a horizontally stretched state, and the net lifting unit raises and lowers the frame body.

The nursing care bed according to a third embodiment of the present invention is characterized in that the frame body includes: a head-side frame portion arranged in an area corresponding to an upper half of the body of the care recipient and connected to the frame body so as to be able to swing and rotate upward; a foot-side frame portion arranged in an area corresponding to lower legs of the care recipient and connected to the frame body so as to be able to swing and rotate downward; a head-side-frame driving unit which swings and rotates the head-side frame portion to raise up the upper half of the body of the care recipient; and a foot-side-frame driving unit which swings and rotates the foot-side frame portion to pull down the lower legs of the care recipient.

The nursing care bed according to a fourth embodiment of the present invention is characterized in that the frame body has a net bending unit for bending the support net in a lateral direction when supporting the body of the care recipient with the support net.

Advantageous Effects of Invention

The nursing care bed of the present invention enables a care recipient to get up from bed with almost no assistance or effort from a caregiver.

DESCRIPTION OF EMBODIMENTS

Hereinafter, a nursing care bed 1 according to the embodiments of the present invention will be described with reference to the drawings.

Figure 1:
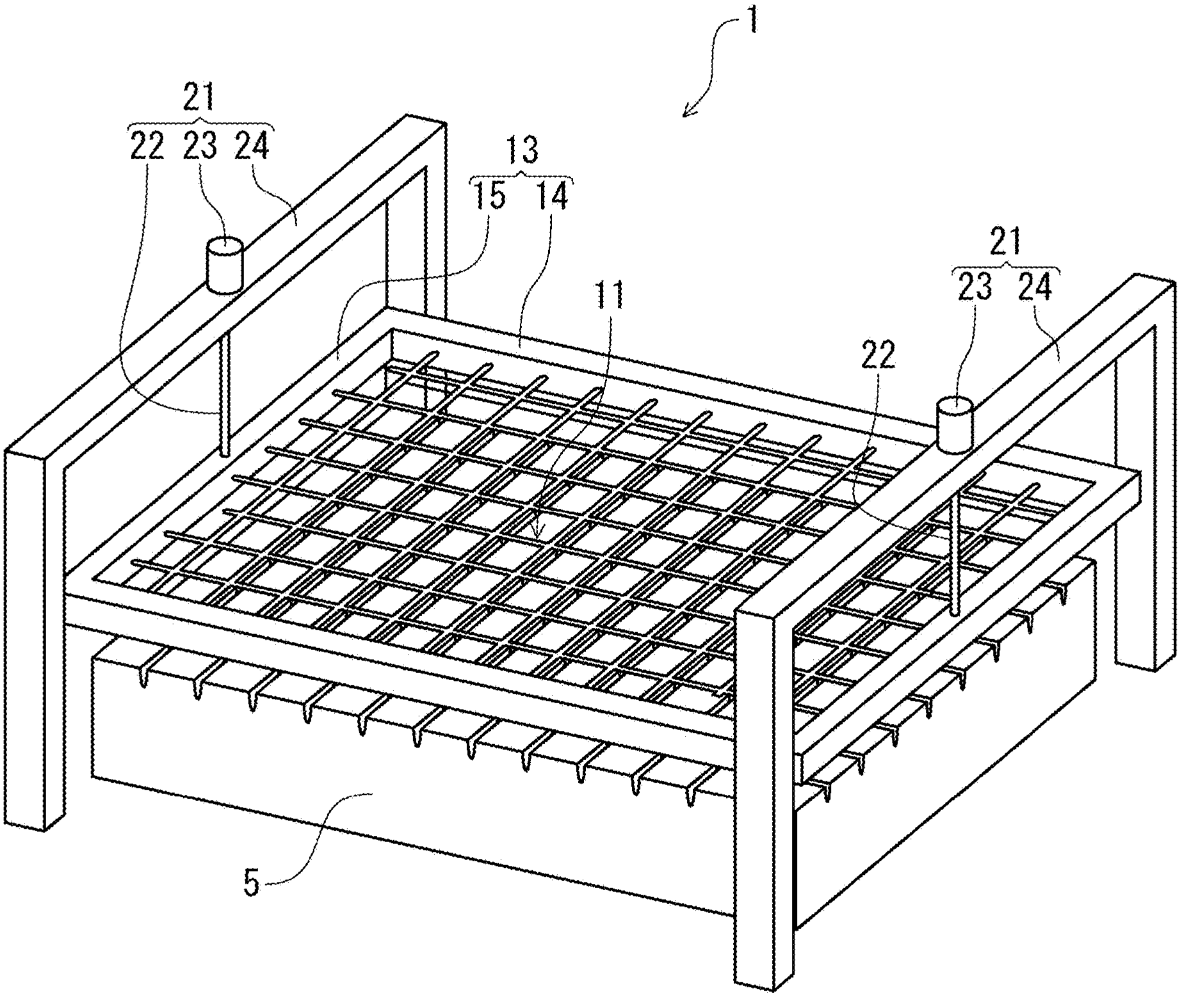
FIG. 1 is a perspective view of a nursing care bed 1.

FIG. 1 is a perspective view of the nursing care bed 1. For convenience of explanation, it shows a state in which a support net 11 (frame body 13) is moved above a nursing care mat 5.

The nursing care bed 1 includes a bed body 2, a nursing care mat 5, the support net 11, the frame body 13, a net lifting unit 21, and the like.

The bed body 2 is a supporting table on which a care recipient (person requiring care) K lies, and bedding is placed on an upper surface thereof.

The bed body 2 may be, for example, a pipe bed (steel bed), a wooden bed, or the like. In addition, it may be a single size bed, a double size bed, a king size bed, or the like.

Figure 2A:
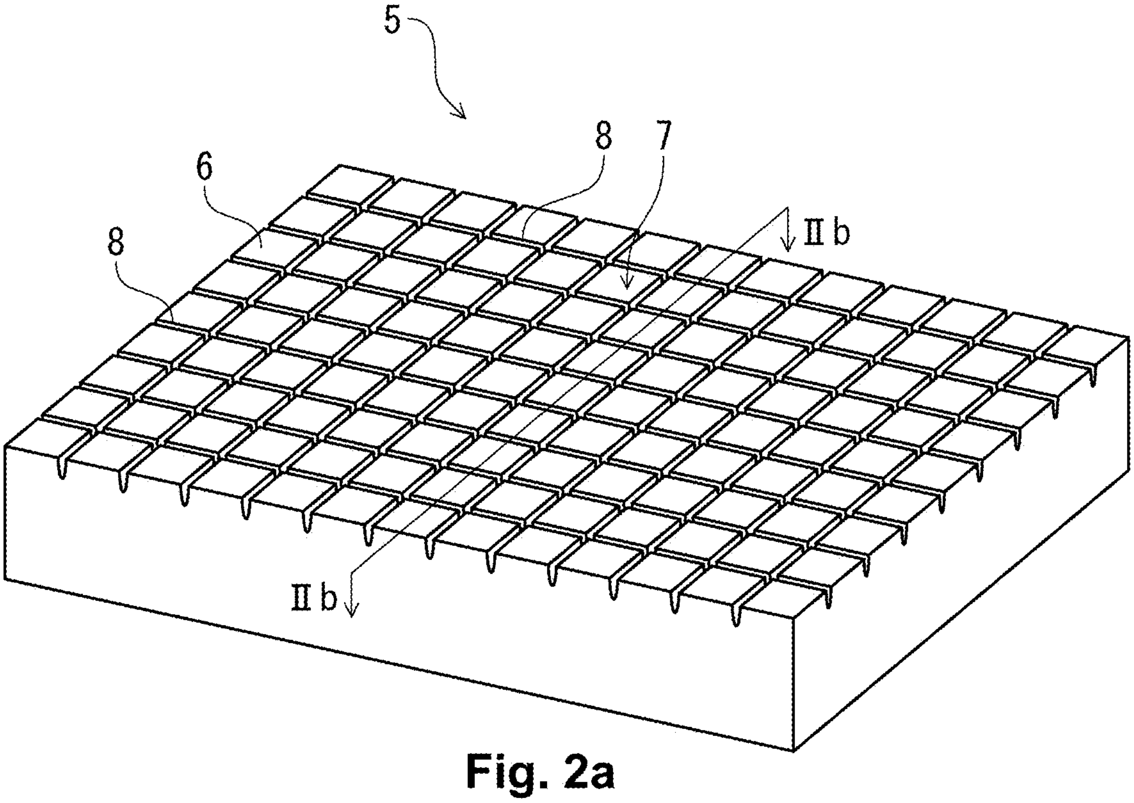
FIG. 2*a* is a perspective view of a nursing care mat 5.

FIG. 2 shows the nursing care mat 5 in (a) a perspective view and (b) a lateral cross section.

The nursing care mat 5 is bedding which is laid on the upper surface of the bed body 2 and is in direct contact with the care recipient K. That is, the care recipient K lies on the nursing care mat 5.

The nursing care mat 5 is made of various materials such as urethane, cotton, polyester, or rayon. The size of the nursing care mat 5 is, for example, 200 cm in length, 140 cm in width, and 40 cm in thickness, and the height from the floor to the upper surface 6 of the nursing care mat 5 is 60 cm.

The nursing care mat 5 may have a plurality of coil springs (pocket coils). The nursing care mat 5 may be made by intertwining resin (fiber) such as polyethylene or polyester in a three-dimensional mesh shape.

In addition, a mattress may be arranged between the nursing care mat 5 and the bed body 2.

A lattice groove 7 is formed on the upper surface 6 of the nursing care mat 5, the lattice groove 7 extending along a longitudinal direction (longer direction) and a lateral direction (shorter direction). The lattice groove 7 is made up of a plurality of grooves (slits) 8 arranged at intervals (pitch) of 100 to 200 mm in the longitudinal direction and the lateral direction, respectively. The depth of each groove 8 (i.e., of the lattice groove 7) is, for example, about 10 to 30 mm.

This lattice groove 7 corresponds to the support net 11. That is, the support net 11 is accommodated (buried) in the lattice groove 7 (grooves 8) in a horizontally spread state.

Figure 2B:
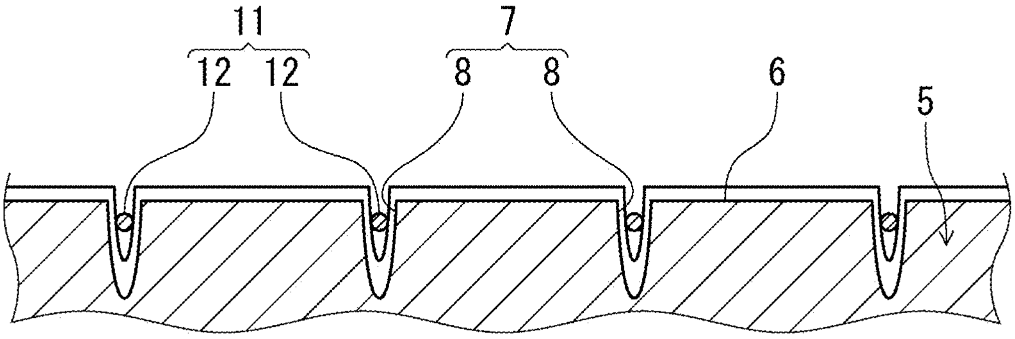
FIG. 2*b* is a lateral cross section of the same.

It should be noted that a highly elastic bed sheet 9 may be laid on the upper surface 6 of the nursing care mat 5 (see FIG. 2*b*). The highly elastic bed sheet 9 is arranged between the nursing care mat 5 and the support net 11 and buried in the lattice groove 7 (grooves 8) together with the support net 11.

Figure 3:
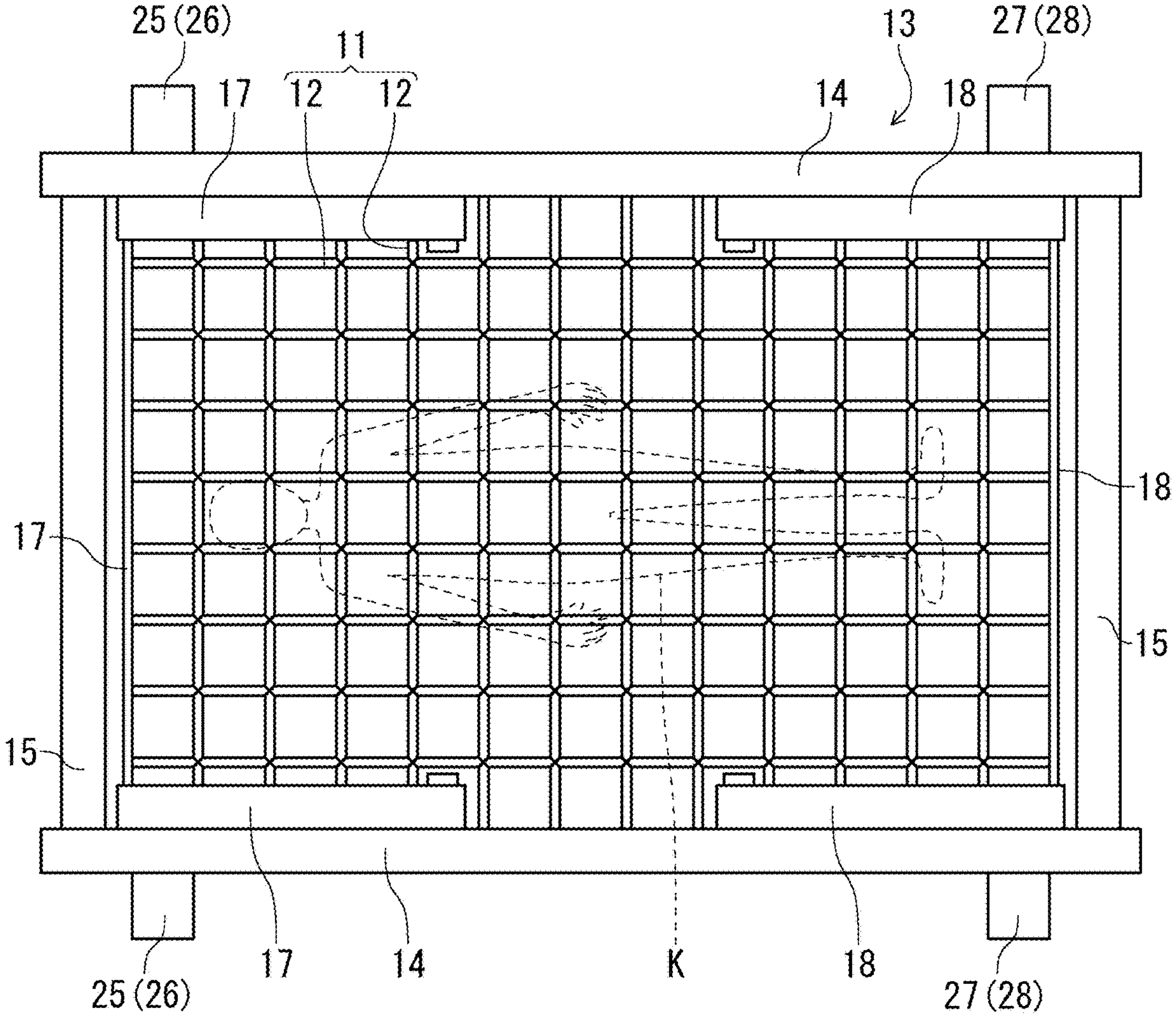
FIG. 3 is a plan view of a support net 11 and a frame body 13.

FIG. 3 is a plan view of the support net 11 and the frame body 13.

The support net 11 is arranged between the nursing care mat 5 and the care recipient K so as to support the body of the care recipient K. The support net 11 is made by weaving a plurality of ropes 12 in a lattice pattern. That is, the support net 11 is made by stretching the ropes 12 in a lattice pattern along the longitudinal direction (longer direction) and the lateral direction (shorter direction). Each rope 12 is made of various materials such as hemp, nylon, or metal.

The support net 11 is arranged at intervals (pitch) of 100 to 200 mm in the longitudinal direction and the lateral direction, respectively. The diameter of each rope 12 varies depending on the material, and for example, it is about 3 to 5 mm for nylon.

As described above, this support net 11 corresponds to the lattice groove 7 formed on the upper surface 6 of the nursing care mat 5. That is, the support net 11 is accommodated (buried) in the lattice groove 7 in a horizontally spread state.

The frame body 13 holds the support net 11 in a horizontally stretched state. The frame body 13 has a frame shape which can surround the outer periphery of the nursing care mat 5. The frame body 13 has a pair of longitudinal frames 14 extending in the longitudinal direction and a pair of lateral frames 15 extending in the lateral direction. The longitudinal frames 14 and the lateral frames 15 are formed of square pipes or the like.

The size of the frame body 13 (inner dimensions of the frame) is, for example, 240 cm in length, 150 cm in width, and 50 mm in thickness. The length of the longitudinal frame 14 is 250 cm in the longitudinal direction, for example, and the length of the lateral frame 15 is 160 cm in the lateral direction, for example.

In addition, the frame body 13 includes a head-side frame portion 17, a foot-side frame portion 18, a head-side-frame driving unit 25, and a foot-side-frame driving unit 27. These will be described later.

Then, the support net 11 is stretched without sagging on the inside of the frame body 13 (the head-side frame portion 17 and the foot-side frame portion 18).

Returning to FIG. 1, the net lifting unit 21 raises and lowers the support net 11. More specifically, the net lifting unit 21 raises and lowers the frame body 13 on which the support net 11 is stretched.

The net lifting unit 21 has: a chain 22 connected to the center (lateral center) of the lateral frame 15 of the frame body 13, a drive motor 23 for winding up the chain and the like; a gate-shaped frame 24 supporting the drive motor 23; and the like.

The gate-shaped frames 24 are positioned on the head and foot sides of the nursing care mat 5 and the frame body 13, respectively, and support the drive motor 23 above the nursing care mat 5.

The net lifting unit 21 simultaneously drives a pair of drive motors 23, thereby each of the drive motors 23 winds up the chain 22 so as to raise the frame body 13 on which the support net 11 is stretched while maintaining it in a horizontal state. The net lifting unit 21 raises the support net 11 (frame body 13) to, for example, an upper position of about 50 to 80 cm from the upper surface 6 of the nursing care mat 5.

As a result, the net lifting unit 21 pulls upward the support net 11 buried in the lattice groove 7 of the nursing care mat 5 for supporting the body of the care recipient K with the support net 11. In addition, the net lifting unit 21 raises the support net 11 to separate the care recipient K from the nursing care mat 5 (bed body 2).

The net lifting unit 21 also drives the pair of drive motors 23, thereby each of the drive motors 23 winds back the chain 22 (letting out the chain 22) so as to lower the frame body 13 on which the support net 11 is stretched while maintaining it in a horizontal state. The net lifting unit 21 lowers the support net 11 (frame body 13) to a lower position of about 10 to 30 mm from the upper surface 6 of the nursing care mat 5.

As a result, the net lifting unit 21 lowers the support net 11 together with the care recipient K so as to place the care recipient K on the nursing care mat 5 (bed body 2). In addition, the net lifting unit 21 lowers the support net 11 to separate the support net 11 from the care recipient K and bury (accommodate) it in the lattice groove 7 of the nursing care mat 5.

Figure 4:
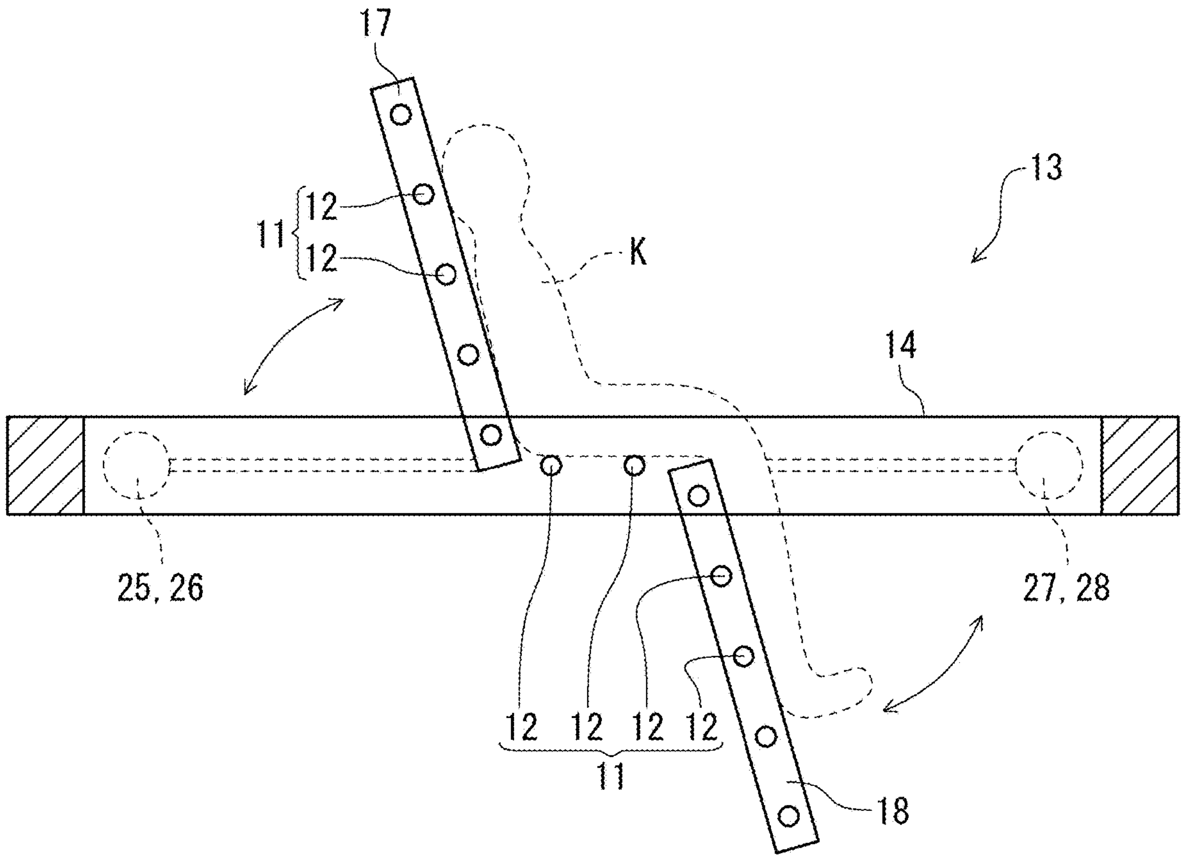
FIG. 4 is a longitudinal cross section of the frame body 13 and the support net 11 when a head-side frame portion 17 and a foot-side frame portion 18 are operated.

FIG. 4 is a longitudinal cross section of the frame body 13 and the support net 11 when a head-side frame portion 17 and a foot-side frame portion 18 are operated.

As described above, the frame body 13 has the head-side frame portion 17, the foot-side frame portion 18, the head-side-frame driving unit 25, and the foot-side-frame driving unit 27 (see FIG. 3).

The head-side frame portion 17 and the foot-side frame portion 18 are gate-shaped (U-shaped) frames connected to the inside of the frame body 13. Of the head-side frame portion 17 and the foot-side frame portion 18, frame portions extending in the lateral direction are formed of a bendable member such as a metal wire.

The head-side frame portion 17 is arranged in an area corresponding to an upper half of the body (from the head to around the buttocks) of the care recipient K and arranged horizontally along the longitudinal frame 14 and the lateral frame 15. Base ends (bases of the gate shape) of the head-side frame portion 17 are connected to the longitudinal frame 14 such that the head-side frame portion 17 can swing and rotate upward relative to the longitudinal frame 14.

The foot-side frame portion 18 is arranged in an area corresponding to lower legs (from around the knee to the toes) of the care recipient K and arranged horizontally along the longitudinal frame 14 and the lateral frame 15. Base ends (bases of the gate shape) of the foot-side frame portion 18 are connected to the longitudinal frame 14 such that the foot-side frame portion 18 can swing and rotate downward relative to the longitudinal frame 14.

The support net 11 is attached on the inside of the head-side frame 17 and the foot-side frame 18 and is stretched without sagging.

The head-side-frame driving unit 25 has a sprocket and a chain (not shown) in addition to a drive motor 26. The sprocket and the chain are accommodated inside the longitudinal frame 14.

The head-side-frame driving unit 25 drives the drive motor 26 so as to swing and rotate the head-side frame portion 17 upward relative to the longitudinal frame 14 with its base ends as fulcrums.

When the head-side-frame driving unit 25 swings the head-side frame portion 17 upward while the support net 11 supports the care recipient K horizontally, the upper half of the body of the care recipient K rises up (is raised up).

The foot-side-frame driving unit 27 has a sprocket and a chain (not shown) in addition to a drive motor 28. The sprocket and the chain are accommodated inside the longitudinal frame 14.

The foot-side-frame driving unit 27 drives the drive motor 28 so as to swing and rotate the foot-side frame portion 18 downward relative to the longitudinal frame 14 with its base ends as fulcrums.

When the foot-side-frame driving unit 27 swings the foot-side frame portion 18 downward while the support net 11 supports the care recipient K horizontally, the lower legs of the care recipient K are pulled down (hang down).

The body of the care recipient K is supported with the support net 11 and separated from the nursing care mat 5, and then the bed body 2 (nursing care mat 5) is moved to a position away from below the support net 11. That is, a state in which there is nothing between the support net 11 and the floor is achieved.

Then, by operating the head-side-frame driving unit 25 and the foot-side-frame driving unit 27, the care recipient K is made to take a sitting position on the support net 11. In this state, when the support net 11 is lowered to a position of about 60 cm from the floor, the feet of the care recipient K come so close to the floor that they almost touch it. This enables the care recipient K to move away from the support net 11 and stand on the floor by himself/herself. That is, by operating the nursing care bed 1, the care recipient K can be made to be raised up from the bed body 2 and move away from the nursing care bed 1.

When laying the care recipient K on the bed body 2 (nursing care mat 5), the nursing care bed 1 is operated in the reverse order.

Figure 5:
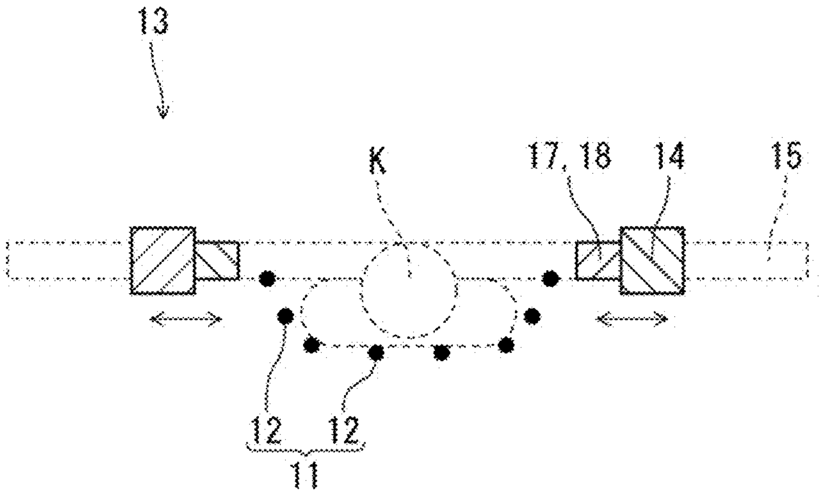
FIG. 5 is a lateral cross section of the frame body 13 and the support net 11 when a longitudinal frame 14 is horizontally moved along a lateral frame 15.

FIG. 5 is a lateral cross section of the frame body 13 and the support net 11 when the longitudinal frame 14 is horizontally moved along the lateral frame 15.

If the care recipient K is supported with the support net 11 stretched without sagging, there is a slight risk that the care recipient K should fall off the support net 11 when raising the support net 11.

Therefore, the longitudinal frame 14 may be configured to move horizontally along the lateral frame 15. That is, the longitudinal frame 14 is made to function as a net bending unit of the present invention. Specifically, a pair of longitudinal frames 14 are moved horizontally in the lateral direction (are moved in a direction toward each other). This causes the support net 11 to sag in the lateral direction (hang downward). This makes it difficult for the care recipient K to turn over in his/her sleep or the like while being supported with the support net 11. In this way, it is possible to prevent the care recipient K from falling off the support net 11.

According to the present invention, it is possible to raise the care recipient K up from the nursing care bed 1 and to lay the care recipient K down on the nursing care bed 1 without assistance from a caregiver. The caregiver may operate nursing care bed 1. Furthermore, the care recipient K may operate the nursing care bed 1 by himself/herself using remote control.

The present invention is not limited to the above-described embodiments but includes various modifications to the above-described embodiments without departing from the spirit of the present invention. The specific shapes and configurations given in the embodiments are merely examples and may be modified as appropriate.

The head-side-frame driving unit 25 and the foot-side-frame driving unit 27 include the drive motors 26 and 28, the chain, and the like, respectively, but they are not limited to such a configuration. The head-side-frame driving unit 25 and the foot-side-frame driving unit 27 may be in a configuration including a pressure drive device such as a hydraulic cylinder or a pneumatic cylinder.

REFERENCE NUMERALS

1 Nursing Care Bed
5 Nursing Care Mat
6 Upper Surface
7 Lattice Groove
8 Groove
9 Bed Sheet
11 Support Net
12 Rope
13 Frame Body
14 Longitudinal Frame (Net Bending Unit)
15 Lateral Frame
17 Head-Side Frame Portion
18 Foot-Side Frame Portion
21 Net Lifting Unit
22 Chain
23 Drive Motor
24 Gate-Shaped Frame
25 Head-Side-Frame Driving Unit
26 Drive Motor
27 Foot-Side-Frame Driving Unit
28 Drive Motor
K Care Recipient (Person Requiring Care)

The invention claimed is:

1. A nursing care bed comprising:
a nursing care mat on which a care recipient lies;
a support net which is arranged between the nursing care mat and the care recipient and supports a body of the care recipient;
a frame body for holding the support net in a horizontally stretched state; and
a net lifting unit for raising and lowering the frame body, characterized in that:
an upper surface of the nursing care mat has a lattice groove corresponding to the support net;
the net lifting unit lowers the frame body to bury the support net in the lattice groove and raises the frame body to separate the care recipient from the nursing care mat; and
the frame body comprises:
a head-side frame portion arranged in an area corresponding to an upper half of the body of the care recipient and connected to the frame body so as to be able to swing and rotate upward;
a foot-side frame portion arranged in an area corresponding to lower legs of the care recipient and connected to the frame body so as to be able to swing and rotate downward;

a head-side-frame driving unit which swings and rotates the head-side frame portion to raise up the upper half of the body of the care recipient; and a foot-side-frame driving unit which swings and rotates the foot-side frame portion to pull down the lower legs of the care recipient.

2. The nursing care bed according to claim 1, characterized in that the frame body comprises a bending unit for bending the support net in a lateral direction when supporting the body of the care recipient with the support net.

* * * * *